United States Patent
Huggins et al.

(10) Patent No.: US 11,120,655 B1
(45) Date of Patent: Sep. 14, 2021

(54) USING A VEHICLE TO IDENTIFY A STATUS OF A GARAGE DOOR

(71) Applicant: Ford Global Technologies, LLC, Dearborn, MI (US)

(72) Inventors: Scott Huggins, Novi, MI (US); Jeremy Lerner, Southfield, MI (US); Jason Woo, Northville, MI (US); Daniel Sullivan, Grosse Pointe, MI (US); Paige Wong, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/921,692

(22) Filed: Jul. 6, 2020

(51) Int. Cl.
*G07C 9/00* (2020.01)
*G06K 9/00* (2006.01)
*B60R 1/00* (2006.01)

(52) U.S. Cl.
CPC .......... *G07C 9/00896* (2013.01); *G07C 9/00* (2013.01); *B60R 1/00* (2013.01); *B60R 2300/8093* (2013.01); *G06K 9/00805* (2013.01)

(58) Field of Classification Search
CPC .. G07C 9/00; G07C 9/00896; G07C 9/00928; G05B 19/00; B60W 30/06
See application file for complete search history.

(56) References Cited

U.S. PATENT DOCUMENTS

| | | | |
|---|---|---|---|
| 9,208,629 B2 | 12/2015 | Saladin et al. | |
| 9,879,466 B1 | 1/2018 | Yu | |
| 10,846,960 B1* | 11/2020 | Lemberger | H04N 7/183 |
| 2008/0079570 A1 | 4/2008 | Fineman et al. | |
| 2011/0032073 A1* | 2/2011 | Mullet | E05F 15/668 340/5.7 |
| 2015/0084779 A1* | 3/2015 | Saladin | H04W 4/029 340/686.6 |
| 2018/0056988 A1* | 3/2018 | Heil, Jr. | B60W 30/06 |
| 2019/0048639 A1* | 2/2019 | Lickfelt | E04H 6/02 |

OTHER PUBLICATIONS

"Your Smart Phone Can Now Be Your Garage Door Control!," Web page <https://www.dominator.com.nz/dominator-news/your-smart-phone-can-now-be-your-garage-door-control..html>, 5 pages, retrieved from the Internet on Jan. 5, 2021.

(Continued)

*Primary Examiner* — Van T Trieu
(74) *Attorney, Agent, or Firm* — Brandon Hicks; Eversheds Sutherland (US) LLP

(57) ABSTRACT

Example embodiments described in this disclosure are generally directed to using a vehicle to identify a status of a garage door, such as, for identifying whether the garage door is fully closed, fully open, or partially open. The identification may be carried out in response to an inquiry from an individual, such as, a driver of the vehicle that has exited through the garage door. A detection apparatus such as an image capture system or an ultrasonic sensor that can be a part of a vehicle security system may be used for identifying the status of the garage door. The image capture system may capture and store an image of the garage door when the vehicle is exiting the garage. Upon receiving an inquiry from the driver, the garage door status detection system may display the image on a smartphone of the driver or an infotainment system in the vehicle.

20 Claims, 5 Drawing Sheets

(56) References Cited

OTHER PUBLICATIONS

"Garage Door Opener App," Web page <https://www.overheaddoor.com/garage-door-opener-app.html>, 5 pages, retrieved from the Internet on Jan. 5, 2021.

"Driving the Future of Automotive Connectivity—Automotive Connectivity Solutions / Chamberlain," Web page <https://www.chamberlain.com/about-chamberlain/automotive-connectivity-solutions.html>, 8 pages, retrieved from the Internet on Jan. 5, 2021.

* cited by examiner

USING A VEHICLE TO IDENTIFY A STATUS OF A GARAGE DOOR

BACKGROUND

A driver pulling a vehicle out of a garage is often preoccupied with various thoughts, such as, for example, work-related activities when driving out to work, time-related activities when dropping off a child at school, or a list of items to be purchased at a grocery store. In some cases, when not preoccupied with such thoughts, the driver may be distracted due to performing actions such as handling children in the vehicle, talking to a passenger in the vehicle, or looking out for vehicles passing by on a road at the end of a driveway to the garage. Typically, and in spite of being preoccupied or distracted, the driver may automatically depress a garage door remote control button in the vehicle in order to close a garage door of the garage as the vehicle is exiting the garage. The action of depressing the garage door remote control button may be carried out automatically without paying conscious attention to the action.

After driving away from the building, and out of sight of the garage, the driver may suddenly wonder if he/she had actually depressed the garage door remote control button and if the garage door had actually closed in response to depressing the garage door remote control button. In some cases, the garage door may have been left open because the driver had forgotten to depress the garage door remote control button. In other cases, the driver may have depressed the garage door remote control button and the garage door may have begun to close. However, the garage door may then have rolled back open when an infrared sensor detected an object in the movement path of the garage door.

The driver may therefore decide either to turn the vehicle around and go back to verify whether the garage door is closed or may decide to phone a person residing in the building to verify whether the garage door is closed. Such actions can be time-consuming and frustrating to carry out. Accordingly, a need exists to provide a solution that would allow the driver to identify a status of the garage door (open, close, partially open, for example) without having to go back to the garage or to call the person residing in the building.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
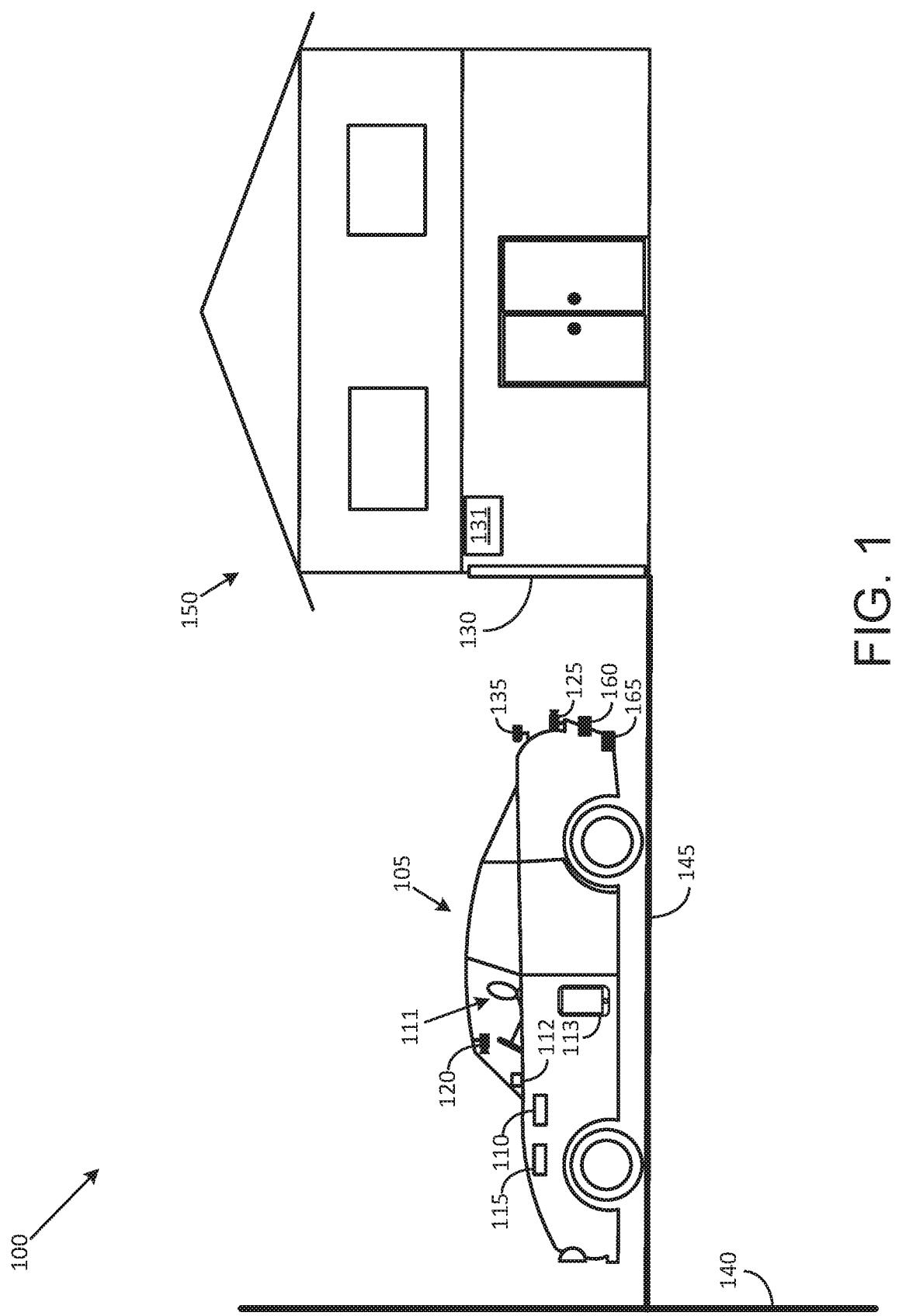
FIG. 1 shows an example of a garage door status detection system in accordance with an embodiment of the disclosure.

In terms of a general overview, certain embodiments described in this disclosure are directed to systems and methods for using a vehicle to identify a status of a garage door, such as, for example, identifying whether the garage door is fully closed, fully open, or partially open. The identification may be carried out in response to an inquiry received from an individual, such as, for example, a driver of a vehicle that has exited through the garage door. In an example implementation, a detection apparatus, such as an image capture system or an ultrasonic sensor, that can be a part of a vehicle security system provided in the vehicle and may be used for identifying the status of the garage door. The image capture system may capture and store an image (or a video clip) of the garage door when the vehicle is exiting the garage. Upon receiving an inquiry from the driver, the garage door status detection system may display the image (or video clip) on a smartphone of the driver or on an infotainment system in the vehicle. In some cases, a text message may be displayed indicating the status of the garage door (open, closed, partially-open, etc.)

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "building" as used herein refers to any of various structures such as, for example, a house, a home, an office, or a commercial establishment (a store, a manufacturing facility, a warehouse, etc.). The word "vehicle" as used herein encompasses various types of vehicles such as cars, trucks, vans, and sports utility vehicles (SUVs), and also encompasses various types of automobiles such as a boat, a tractor, or a recreational vehicle (RV) that may house an anti-theft system. Words such as "wireless" or "wirelessly" as used herein are not intended to preclude other forms of communication such as optical communications and wired communications. The examples provided herein encompass such alternative communication technologies. Furthermore, it should be understood that the word "example" as used herein is intended to be non-exclusionary and non-limiting in nature.

FIG. 1 shows an example of a garage door status detection system 100 in accordance with an embodiment of the disclosure. The garage door status detection system 100 includes a vehicle 105 that may be any of various types of vehicles that include components such as a vehicle systems controller 115, an infotainment system 112, an auxiliary computer 110, and various sensors and detection devices that are communicatively coupled to the auxiliary computer 110, and/or the vehicle systems controller 115. In an example implementation, the sensors and detection devices may be included in any of a vehicle security system used to protect the vehicle 105 from vandalism and other untoward activities, a vehicle driver assist system used to help the driver operate the vehicle, and/or an autonomous or semi-autonomous vehicle operation system that allows the vehicle 105 to operate autonomously or with minimal driver input. In another example implementation, the sensors and detection devices may be installed in the vehicle 105 for performing various actions in accordance with the disclosure.

In the example scenario illustrated in FIG. 1, the vehicle 105 is typically parked in a garage of a building 150. The building 150 may be a residence, a house, an office, or a commercial establishment such as a store, a manufacturing facility, or a warehouse that is owned by an individual associated with the vehicle 105. The vehicle systems controller 115 that is a part of the vehicle 105 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The auxiliary computer 110 may execute various functions associated with various devices in the vehicle 105, including devices used for protecting the vehicle 105 against theft, break-ins, or other malicious activities. Various sensors and detection devices, such as, for example, an image capture system 120, an image capture system 125, an ultrasonic sensor 135, a radar sensor 160, and/or a light detection and ranging (LIDAR) device 165, may be installed at various locations in the vehicle 105. For example, the image capture system 120 can include a camera that is mounted above a dashboard of the vehicle 105 and is arranged to capture images of objects located in front of the vehicle 105. The image capture system 125 can include another camera that is mounted on the bumper of the vehicle 105 and is arranged to capture images of objects located behind the vehicle 105.

The ultrasonic sensor 135 may be mounted on the bumper of the vehicle 105 or the trunk of the vehicle 105 and is arranged to detect objects located behind the vehicle 105 using ultrasonic signals. The ultrasonic signals may be used to detect a status of the garage door 130, by detecting a change in a distance measurement between a closed condition of the garage door 130 and an open condition of the garage door 130. The ultrasonic sensor 135 can be used day or night for detection purposes and may be coupled to the image capture system 125 for capturing images of the garage door 130 when the ultrasonic sensor detects a change in status of the garage door 130 (for example, when the garage door 130 is closing).

In one example scenario, the ultrasonic sensor 135 may detect the garage door 130 closing, when the driver 111 depresses a button of a garage door remote control device in the vehicle 105 and the vehicle 105 begins to move out on to the driveway 145. The image capture system 125 may activate to capture an image (or a video clip) of the garage door 130 when the ultrasonic sensor 135 sends a signal indicating the closing of the garage door 130. In this example scenario, the vehicle 105 is being driven forwards by the driver 111 on the driveway 145 and out of the garage.

In another example scenario, the vehicle 105 may be reversed out of the garage with a front portion of the vehicle 105 facing the garage door 130. In this scenario, the image capture system 120 may receive a wireless signal from a radio transmitter 131 that is coupled to a garage door opening motor mechanism. The wireless signal may be transmitted to the image capture system 120 by the radio transmitter 131 each time the garage door opening motor mechanism is operated. Upon receiving the wireless signal, the image capture system 120 may start recording a video clip that includes images of the garage door 130 in action (closing or opening). The video clip may be stored in a storage device (not shown) that can be a part of the garage door status detection system 100. The vehicle 105 may be driven out of the driveway 145 and on to a road 140. The vehicle 105 may then reach a location on the road 140 where the garage door 130 is no longer visible to the driver 111.

At this time, the driver 111 may be struck with a thought that he/she may not have closed the garage door 130. Rather than turn around towards the building 150 to check, or call someone in the building to verify whether the garage door 130 is closed, the driver may, in accordance with disclosure, transmit an inquiry to the garage door status detection system 100. The inquiry may be transmitted, for example, to the auxiliary computer 110, in various ways, such as, for example, through a touch screen of the infotainment system 112, or via a personal device 113 of the driver 111. The personal device 113 can be, for example, a smartphone, a tablet computer, or a phablet (phone plus tablet). Upon receiving the inquiry, the auxiliary computer 110 may play the video clip upon the infotainment system 112 and/or the personal device 113 and the driver 111 may observe the video clip to determine the status of the garage door 130. In some cases, the auxiliary computer 110 may automatically display an image or a text message upon the infotainment system 112 and/or the personal device 113 to indicate a status of the garage door 130, when the vehicle 105 travels beyond a certain distance from the building 150 (beyond a geofence around the building 150, for example).

Figure 2:
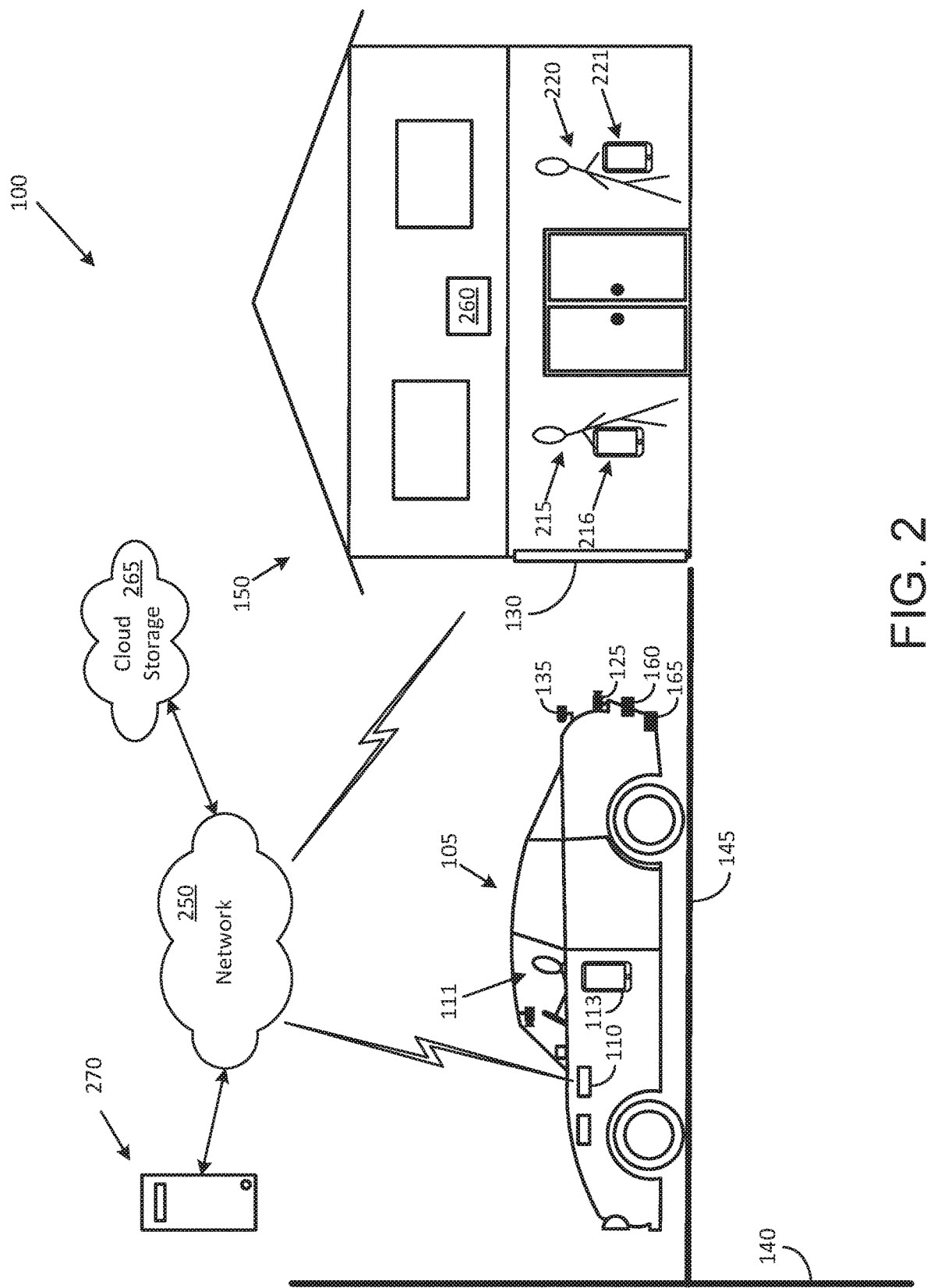
FIG. 2 illustrates a first example scenario associated with operating a garage door status detection system in accordance with the disclosure.

FIG. 2 illustrates yet another example scenario associated with operating the garage door status detection system 100 in accordance with the disclosure. In this scenario, devices such as the image capture system 125 or the image capture system 120 may capture an image or a video clip of the garage door 130 in the manner described above when the vehicle 105 is driven out of the garage (either in forward gear or in reverse gear). The vehicle 105 may be driven out of the driveway 145 and on to the road 140 to a location where the garage door 130 is no longer visible to the driver 111.

The auxiliary computer 110 automatically processes the images and/or the video clip captured by the image capture system 125 (or the image capture system 120) when the vehicle 105 was on the driveway 145, and determines that the driver 111 of the vehicle 105 has forgotten to close the garage door 130. Upon making such a determination, the auxiliary computer 110 may wirelessly transmit an alert signal though a network 250 to a device 260 in the building 150. The driver 111 may not be alerted about the transmission. The device 260 may be any of various types of devices, such as, for example, a smart home device. One example of a smart home device is Amazon's Alexa®. The smart home device may cooperate with a garage door operating system (not shown) for automatically closing the garage door 130. The driver 111 may, or may not, be made aware of the closing operation.

In an alternative implementation, the auxiliary computer 110 may wirelessly transmit an alert signal though a network 250 to a personal device 216 of the individual 215 residing in the building 150 or to an alerting device (beeper, flashing light, etc.) located in the building 150. Upon receiving the signal, the individual 215 may go to the garage and close the garage door 130. In one embodiment, the driver 111 may be informed of the event as well, so as to remind the driver 111 to make note to close the garage door 130 in the future. This action may be carried out by transmitting a text message, an email message, and/or a voice message to the driver 111. In another embodiment, the driver 111 may not be informed of the event so as to avoid distracting the driver 111 when driving.

In yet another alternative implementation, the auxiliary computer 110 may refer to a priority list to identify one or more of several recipients for transmitting an alert signal. The priority list may be stored in one or more of various devices such as, for example, in the auxiliary computer 110, in cloud storage 265, and/or in a server computer 270. An example priority list may indicate that the driver 111 of the vehicle 105 has a highest priority, followed in sequence, by a spouse, a son/daughter, and a neighbor, for example. In one example case, an order of priorities of the various individuals in the priority list may be assigned by the driver 111 or an adult in a family residing in the building 150.

In the illustration shown in FIG. 2, two individuals are present in the building 150 when the auxiliary computer 110 is scrutinizing a priority list to identify a recipient for transmitting an alert signal. The priority list in this example may not include the driver 111 and may indicate that the individual 220 has a higher priority than the individual 215. Consequently, the auxiliary computer 110 wirelessly transmits an alert signal though the network 250 to a personal device 221 of the individual 220 rather than the personal device 216 of the individual 215. This action may also be carried out by transmitting a text message, and email message, and/or a voice message to individuals 215 and/or 220 that are known to be within the building 150 or are usually within the building 150. The presence of the individual 215 and/or the individual 220 in the building 150 and/or within a geofence around the building 150 can be based on detecting an operating status of the personal device 215 and/or the personal device 221. Upon receiving the signal, the individual 220 may go to the garage and close the garage door 130. In one case, the individual 220 may send a message (or other form of communication) to the auxiliary computer 110 after the individual 220 has closed the garage door 130. The auxiliary computer 110 may display a message upon the infotainment system 112 of the vehicle 105 to inform the driver 111 that the garage door 130 has been closed.

In one embodiment, the priority list may be dynamic priority list that is updated dynamically on a periodic or as-needed basis. For example, the priority list may be updated dynamically based on who, and how many, individuals are present in the building 150 at a particular time. For example, the priority list may be updated dynamically in the morning when the individual 215 has left the building 150 to go to work so as to omit the individual 215 from the priority list who would be unable to close the garage door 130 upon receiving an alert message. If more than one individual is present in the building 150 when the individual 215 has left for work, the priority list may be updated to reflect a priority status among the various individuals.

The network 250 may include any one, or a combination of networks, such as a local area network (LAN), a wide area network (WAN), a telephone network, a cellular network, a cable network, a wireless network, and/or private/public networks such as the Internet. For example, the network 250 may support communication technologies such as Wi-Fi, Wi-Fi direct, Ultra-Wideband (UBW), machine-to-machine communication, and/or man-to-machine communication. At least one portion of the network 250 includes a wireless communication link that allows the auxiliary computer 110 to communicate with the device 260, the personal device 216 of the individual 215, and/or the personal device 221 of the individual 220.

Figure 3:
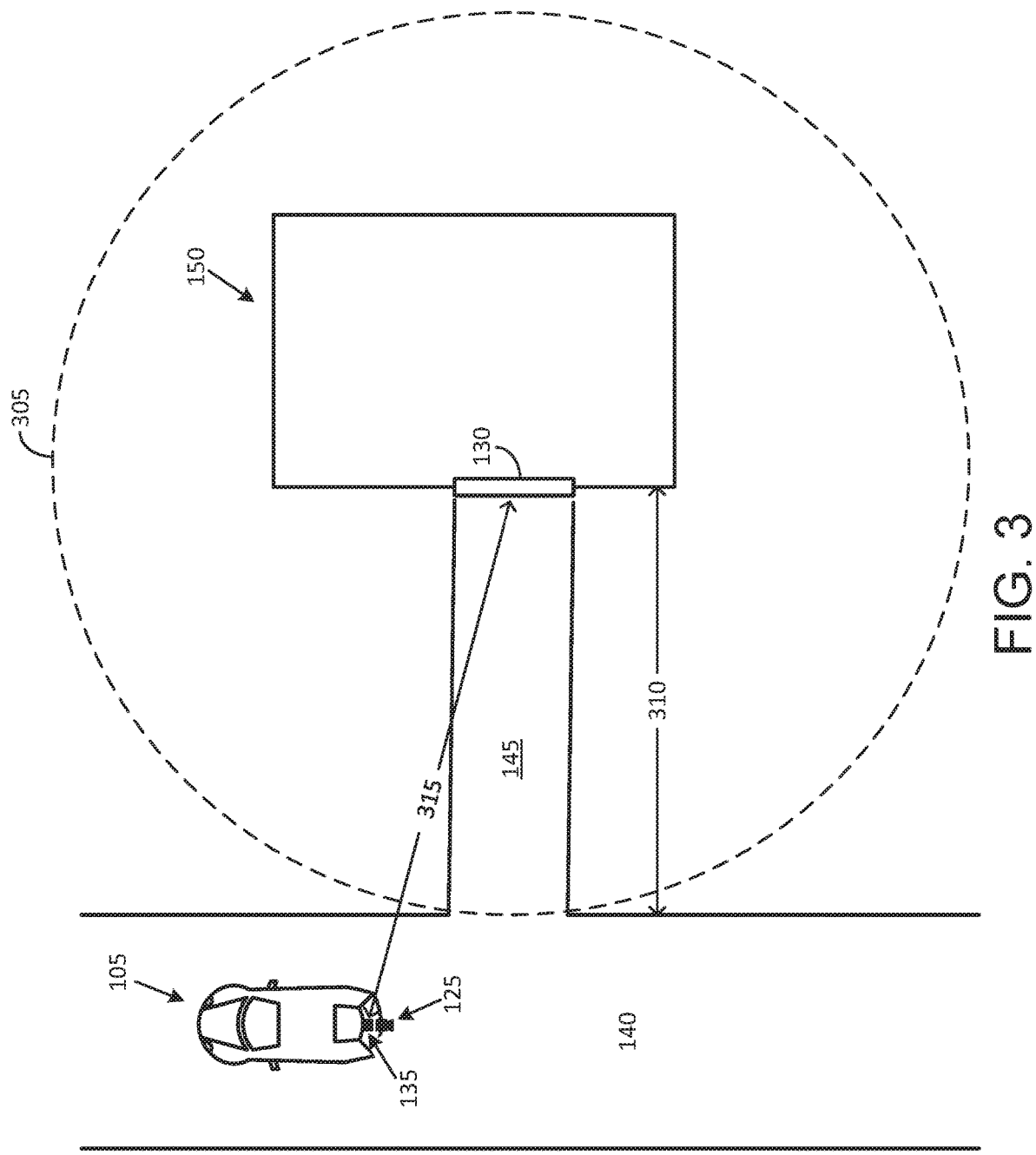
FIG. 3 illustrates an example geofence that may be used as a part of a garage door status detection system in accordance with the disclosure.

FIG. 3 illustrates an example geofence 305 that may be used when operating the garage door status detection system 100 in accordance with the disclosure. The geofence 305 in this example implementation is shaped as a circle. However, in other implementations, the geofence 305 can have various other shapes such as, for example, an oval shape, a rectangular shape, a polygonal shape, or an irregular shape. The dimensions of the geofence 305 may be defined by various entities on the basis of various parameters. For example, the dimensions of the geofence 305 may be defined by the driver 111 of the vehicle 105, or an individual residing in the building 150, and may be based on a structural part of the building 150 (a corner, for example) or a drivable surface leading up to the building (the driveway 145, for example).

In an example implementation, the radius of the geofence 305 may be defined on the basis of a length 310 of the driveway 145. In another example implementation, the radius of the geofence 305 may be defined by an operating range of a garage door opener in the vehicle 105. In yet another example implementation, the radius of the geofence 305 may be defined by an operating range of a sensor in the vehicle. The sensor can be any sensor in the vehicle 105 that is used to detect the status of the garage door 130 (open, closed, partially open, etc.). The vehicle 105 can include one or more sensors such as for example, the ultrasonic sensor 135 that can measure a separation distance 315 between the vehicle 105 and the garage door 130 to detect whether the vehicle 105 is inside the geofence 305. Elements of the garage door status detection system 100 (such as the auxiliary computer 110) refrain from carrying out any action upon the garage door 130 as long as the vehicle 105 is located inside the geofence 305. Consequently, no action is taken with respect to the garage door 130 when the vehicle 105 is parked on the driveway 145.

The ultrasonic sensor 135 determines that the separation distance 315 between the vehicle 105 and the garage door 130 exceeds the radius of the geofence 305 when the vehicle 105 moves out of the driveway 145 and on to the road 140. At this time, the ultrasonic sensor 135 sends a signal to the auxiliary computer 110 to inform the garage door status detection system 100 of the event. The auxiliary computer 110 may automatically analyze an image or a video clip captured by the image capture system 125 as the vehicle 105 was moving on the driveway 145 so as to identify the status of the garage door 130. If the garage door 130 is open (or partially closed) the auxiliary computer 110 may automatically take action to initiate closure of the garage door 130 in various ways such as described above.

In some implementations, the auxiliary computer 110 may initiate such actions after a time delay. The time delay may be set by various entities such as, for example, the driver 111 of the vehicle 105 and/or a manufacturer of the vehicle 105. The time delay may be defined on the basis of various factors, such as, for example, to allow the vehicle 105 to be moved out of the garage temporarily for a brief period of time or to provide additional time to allow a resident of the building 150, such as, for example, a spouse, to pull out another vehicle after the driver 111 has moved the vehicle 105 out of the garage. When allowing more time for the spouse to pull out the other vehicle, the vehicle 105 may be either located inside the geofence 305 or may have moved outside the geofence 305. If the vehicle 105 has moved outside the geofence 305, the garage door status detection system 100 does not attempt to close the garage door 130 until the time delay has expired.

Figure 4:
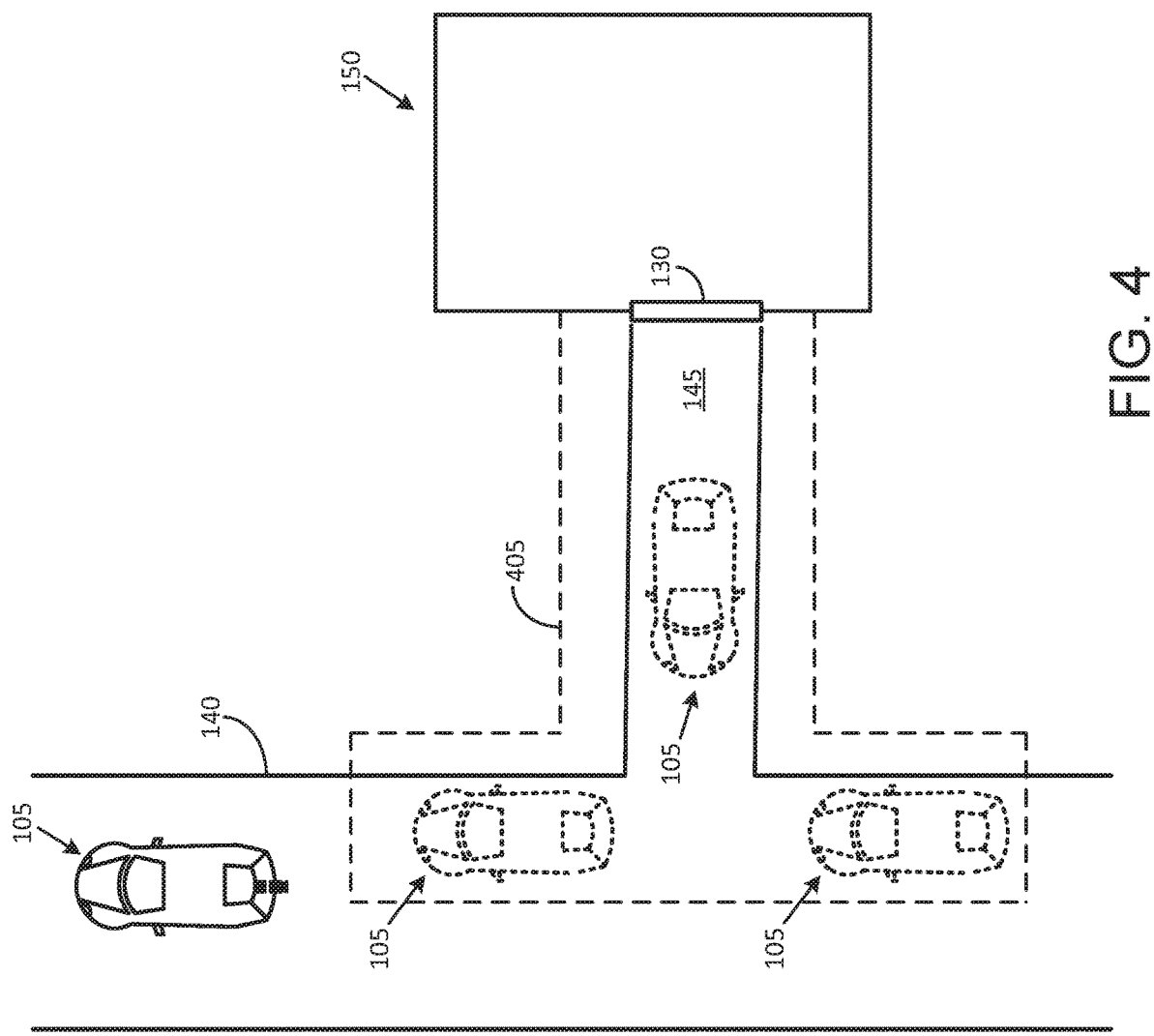
FIG. 4 illustrates another example geofence that may be used as a part of a garage door status detection system in accordance with the disclosure.

FIG. 4 illustrates an example geofence 405 that may be used when operating the garage door status detection system 100 in accordance with the disclosure. The geofence 405 in this example implementation is T-shaped and surrounds the driveway 145 as well as a section of the road 140. It must be understood that the T-shape indicated with sharp corners and lines is merely an illustrative example, and the actual shape of the geofence 405 may have a non-linear perimeter that encompasses the driveway 145 and the section of the road 140.

Elements of the garage door status detection system 100 (such as the auxiliary computer 110) refrain from carrying out any action upon the garage door 130 as long as the vehicle 105 is located inside the geofence 405. Consequently, no action is taken with respect to the garage door 130 when the vehicle 105 is parked on the driveway 145 or near the curb on the road 140 abutting the driveway 145. The dashed line outlines of the vehicle 105 indicate various locations where the vehicle 105 can be parked with no action being taken by the garage door status detection system 100.

One or more of various sensors or image capture systems in the vehicle 105 may be used to detect a movement of the vehicle 105 outside the geofence 405. The auxiliary computer 110 may automatically analyze an image or a video clip captured by the image capture system 125 when the vehicle 105 began moving out of the geofence 405 so as to identify the status of the garage door 130. If the garage door 130 is open (or partially closed) the auxiliary computer 110 may automatically take action to initiate closure of the garage door 130 in various ways such as described above. In some implementations, the auxiliary computer 110 may initiate such actions only after a time delay in the manner described above.

In some cases, the garage door status detection system 100 may verify and/or store, a status of the garage door 130 periodically when the vehicle 105 is located inside the geofence 405. Being aware of the status of the garage door 130 allows the garage door status detection system 100 to take action upon detecting an unusual condition.

Figure 5:
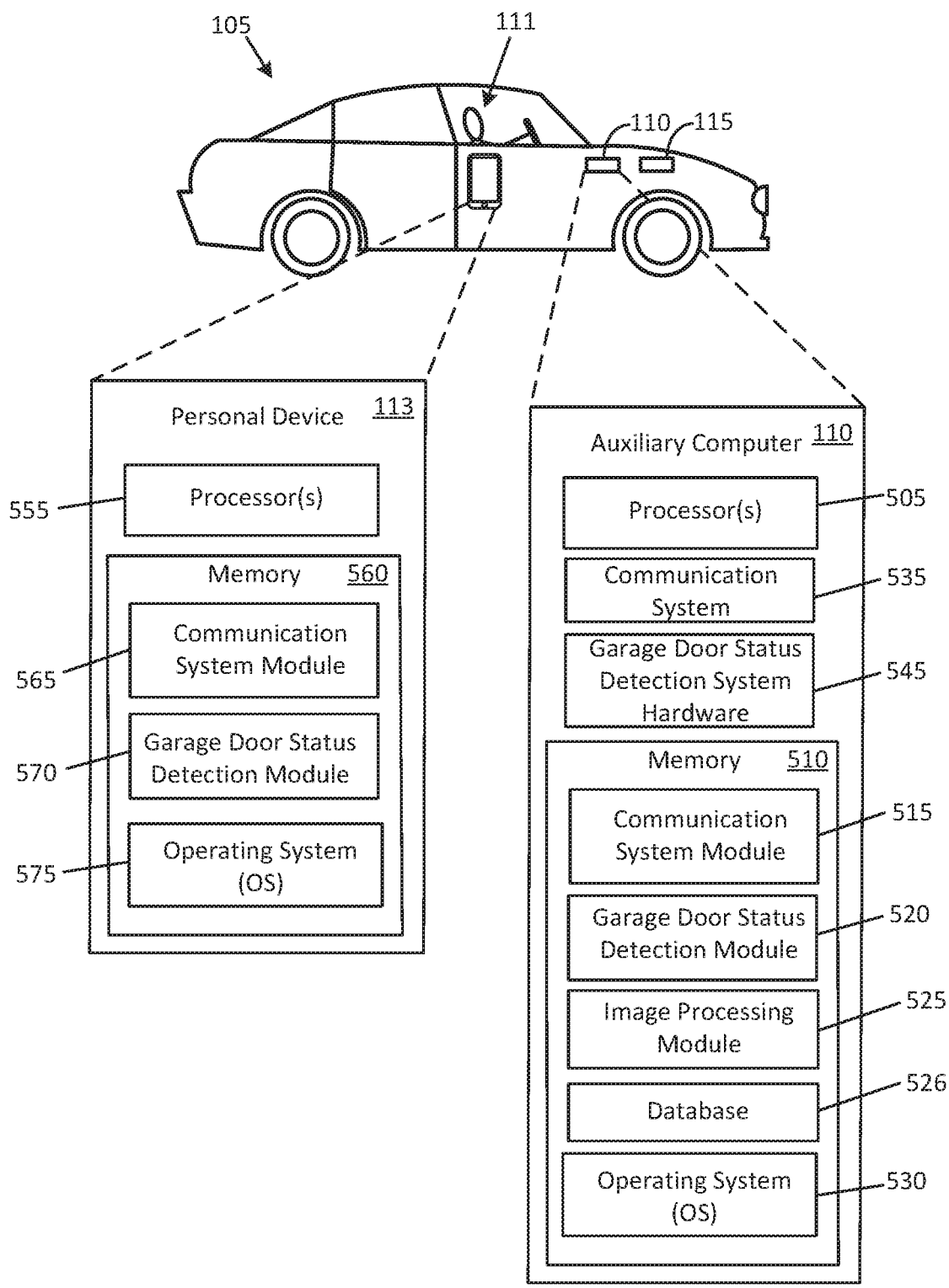
FIG. 5 shows some example components that can be included in a garage door status detection system in accordance with the disclosure.

FIG. 5 shows some example components that can be included in the personal device 113 and the auxiliary computer 110 of the garage door status detection system 100 in accordance with the disclosure. The auxiliary computer 110 may include a processor 505, a communication system 535, a garage door status detection system hardware 545, and a memory 510. The communication system 535 can include a wireless transceiver that allows the auxiliary computer 110 to communicate with various devices such as the personal device 113 (for example, to display garage door status to the driver 111) and/or the server computer 270.

The wireless transceiver may use one or more of various wireless technologies such as Bluetooth®, Ultra-Wideband (UWB), Wi-Fi, ZigBee®, Li-Fi (light-based communication), audible communication, ultrasonic communication, or near-field-communications (NFC), for carrying out wireless communications with devices such as the personal device 113. The wireless transceiver may use any of various communication formats such as, for example, a vehicle-to-everything (V2X) communication format, an Internet communications format, or a cellular communications format for communicating with the server computer 270, or with devices such as the personal device 216 of the individual 215 and the personal device 221 of the individual 220.

The communication system 535 may also include circuitry for receiving information (signals, images etc.) from various devices in the vehicle 105, such as, for example, the image capture system 120, the image capture system 125, and the ultrasonic sensor 135.

The garage door status detection system hardware 545 can include devices that cooperate with various sensors and detectors such as the image capture system 120, the image capture system 125, the ultrasonic sensor 135, the radar sensor 160, and/or the LIDAR device 165. In some implementations, the garage door status detection system hardware 545 can be omitted from the auxiliary computer 110 and incorporated into the vehicle systems controller 115 instead.

The memory 510, which is one example of a non-transitory computer-readable medium, may be used to store an operating system (OS) 530, a database 526, and code modules such as a communication system module 515, a garage door status detection module 520, and an image processing module 525. The code modules are provided in the form of computer-executable instructions that can be executed by the processor 505 for performing various operations in accordance with the disclosure.

The communication system module 515 may include computer-executable instructions for allowing the garage door status detection module 520 to communicate with various elements such as the personal device 113 of the driver 111, the personal device 216 of the individual 215, the personal device 221 of the individual 220, the server computer 270, the image capture system 120, the image capture system 125, and the ultrasonic sensor 135

The database 526 may be used to store reference images, such as a front view of the building 150, a view of the garage door 130 when in a closed condition, a view of the garage door 130 when in an open condition, a view of the garage door 130 when in a partially-open condition, and a view of the garage door 130 during various time so of the day (morning, evening, night etc.).

The garage door status detection module 520 can enable the auxiliary computer 110 to carry out various actions described herein with respect to the garage door 130. Some example actions may include cooperating with the communication system 535 and/or the garage door status detection system hardware 545 for obtaining and analyzing images or video clips of the garage door 130, defining a geofence (such as the geofence 305 and the geofence 405), and determining that the vehicle 105 has moved outside the geofence.

In some embodiments, the garage door status detection module 520 may utilize the image processing module 525 to process images that are provided to the auxiliary computer 110 by an image capture system in the vehicle 105 (such as the image capture system 120 or the image capture system 125). The processing may be directed at determining whether the garage door 130 is in an open condition, closed condition, or a partially-open condition. Various image processing techniques may be used such as, for example, an image processing algorithm modeled on a neural network that is trained to analyze images of the garage door 130 at various times, in various conditions, and in various configurations.

In some embodiments, reference images may be used by the image processing module 525 for detecting a status of the garage door 130. For example, a first reference image may provide an indication of the garage door 130 in an open condition, a second reference image may provide an indication of the garage door 130 in a closed condition, and a third reference image may provide an indication of the garage door 130 in a partially-open condition.

In some embodiments, reference parameters such as distance parameters may be used by the image processing module 525 for detecting a status of the garage door 130. The distance parameters may be generated by using sensors such as, for example, the ultrasonic sensor 135, the radar sensor 160, and/or the LIDAR device. A first reference distance parameter may, for example, provide an indication of a distance between the vehicle 105 and the garage door 130 when the vehicle 105 is at a known location (end of the driveway, for example). A second reference distance parameter may, for example, provide an indication of a distance between the vehicle 105 and an object such as a mailbox, for example. Thus, for example, the garage door status detection module 520 may conclude that the garage door 130 is open when a distance measured by a sensor when the vehicle 105 is located at the end of the driveway exceeds the first reference distance parameter.

In another embodiment, the garage door status detection module 520 may process images to detect that the garage door 130 is open under abnormal circumstances. For example, the garage door 130 may be open late at night when the vehicle 105 is parked inside the garage. A message may be sent out to one or more individuals in the form of an alert or a recommendation to close the garage door 130.

The personal device 113 may include a processor 555 and a memory 560. The memory 560, which is another example of a non-transitory computer-readable medium, may be used to store an operating system (OS) 575 and code modules such as a communication system module 565 and a garage door status detection module 570. The code modules are provided in the form of computer-executable instructions that can be executed by the processor 555 for performing various operations in accordance with the disclosure.

The communication system module 565 may allow the personal device 113 to communicate with the communication system 535 of the auxiliary computer 110. The garage door status detection module 570 may include computer-executable instructions for enabling the personal device 113 to interact with the auxiliary computer 110 for various purposes such as to receive alerts when the auxiliary computer 110 detects the garage door 130 in an open condition. In one example implementation, the garage door status detection module 520 may be provided in the form of a software application that is loaded into the personal device 113. The driver 111 may do so, for example, by downloading the application from a website.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 510 and the memory 560, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   detecting, by a garage door status detection system in a vehicle, one of a closed condition, an open condition, or a partially-open condition of a garage door of a building; and
   transmitting, by a communication device in the vehicle and based on the detecting, a door-position status of the garage door to a first device associated with a first individual, wherein the first individual is determined based on an evaluation of a priority list comprising at least the first individual.

2. The method of claim 1, wherein the garage door status detection system comprises an image capture system, and wherein the method further comprises:
   determining the door-position status of the garage door by analyzing an image captured by the image capture system.

3. The method of claim 2, wherein the first individual comprises a driver of the vehicle, and wherein transmitting the door-position status comprises transmitting a text message, an email message, and/or a voice message to the driver of the vehicle.

4. The method of claim 2, further comprising:
   transmitting, to the first individual, the door-position status in a text message, an email message, and/or a voice message.

5. The method of claim 2, wherein the vehicle is one of parked in a garage having the garage door, parked in a driveway outside the garage, or moving on the driveway outside the garage.

6. The method of claim 1, wherein determining the first individual further comprises:
   determining a priority of the first individual in the priority list.

7. The method of claim 1, wherein the garage door status detection system comprises an ultrasonic sensor, and wherein determining the door-position status of the garage door comprises transmitting an ultrasonic signal from the ultrasonic sensor towards the garage door.

8. A method comprising:
   receiving, by a garage door status detection system in a vehicle, an inquiry for a door-position status of a garage door of a building;

operating a detection apparatus in the vehicle to detect the door-position status of the garage door or retrieving stored information about the door-position status of the garage door; and transmitting, by a communication device in the vehicle, the door-position status of the garage door to a first device associated with a first individual, wherein the first individual is determined based on an evaluation of a priority list comprising at least the first individual.

9. The method of claim 8, wherein the inquiry is generated by one of a resident of the building or a driver of the vehicle, and wherein the door-position status comprises one of a closed condition, an open condition, or a partially-open condition.

10. The method of claim 8, wherein the garage door status detection system comprises an image capture system and wherein operating the detection apparatus in the vehicle to detect the door-position status of the garage door comprises:

operating the image capture system to capture one of a video clip or an image of the garage door when the vehicle is exiting a garage through the garage door; and storing the one of the video clip or the image in a storage element.

11. The method of claim 10, wherein the operation of operating the image capture system to capture the one of the video clip or the image of the garage door is automatically initiated by the garage door status detection system when the vehicle is one of exiting the garage or moving out of a driveway of the building.

12. The method of claim 10, wherein the storage element is one of located in the vehicle or is a part of cloud-storage.

13. The method of claim 10, wherein retrieving stored information about the door-position status of the garage door comprises retrieving the one of the video clip or the image when the vehicle is outside of a boundary.

14. The method of claim 13, further comprising:

displaying the one of the video clip or the image upon a display device in the vehicle.

15. A non-transitory computer-readable memory medium configured to store instructions thereon that when loaded by at least one processor cause the at least one processor to:

detect one of a closed condition, an open condition, or a partially-open condition of a garage door of a building; and transmit a door-position status of the garage door to a first device associated with a first individual, wherein the first individual is determined based on an evaluation of a priority list comprising at least the first individual.

16. The non-transitory computer-readable memory medium of claim 15, wherein the instructions loaded by the at least one processor further causes the at least one processor to determine the door-position status of the garage door by analyzing an image captured by an image capture system.

17. The non-transitory computer-readable memory medium of claim 16, wherein the first individual comprises a driver of the vehicle, and wherein the door-position status of the garage door is transmitted to the driver of the vehicle in a text message, an email message, and/or a voice message.

18. The non-transitory computer-readable memory medium of claim 16, wherein the door-position status is transmitted to the first individual in a text message, an email message, and/or a voice message.

19. The non-transitory computer-readable memory medium of claim 18, wherein the instructions loaded by the at least one processor further cause the at least one processor to determine a priority of the first individual in the priority list.

20. The non-transitory computer-readable memory medium of claim 15, wherein the instructions loaded by the at least one processor further cause the at least one processor to determine the door-position status of the garage door by transmitting an ultrasonic signal from an ultrasonic sensor towards the garage door.

* * * * *